May 11, 1943.   D. F. WINNEK   2,318,983
STEREO-PHOTOGRAPHY
Filed Sept. 13, 1940   6 Sheets-Sheet 1

INVENTOR
Douglas F. Winnek
BY
Emery, Varney, Whittemore &c
ATTORNEYS

May 11, 1943.        D. F. WINNEK         2,318,983
                  STEREO-PHOTOGRAPHY
              Filed Sept. 13, 1940      6 Sheets-Sheet 3

INVENTOR
Douglas F. Winnek
BY
Emery, Varney, Whittemore & Dix
ATTORNEYS

May 11, 1943.    D. F. WINNEK    2,318,983
STEREO-PHOTOGRAPHY
Filed Sept. 13, 1940    6 Sheets-Sheet 4

INVENTOR
Douglas F. Winnek
BY
ATTORNEYS

May 11, 1943.  D. F. WINNEK  2,318,983
STEREO-PHOTOGRAPHY
Filed Sept. 13, 1940  6 Sheets-Sheet 5

INVENTOR
Douglas F. Winnek
BY
ATTORNEYS

May 11, 1943.  D. F. WINNEK  2,318,983
STEREO-PHOTOGRAPHY
Filed Sept. 13, 1940  6 Sheets-Sheet 6
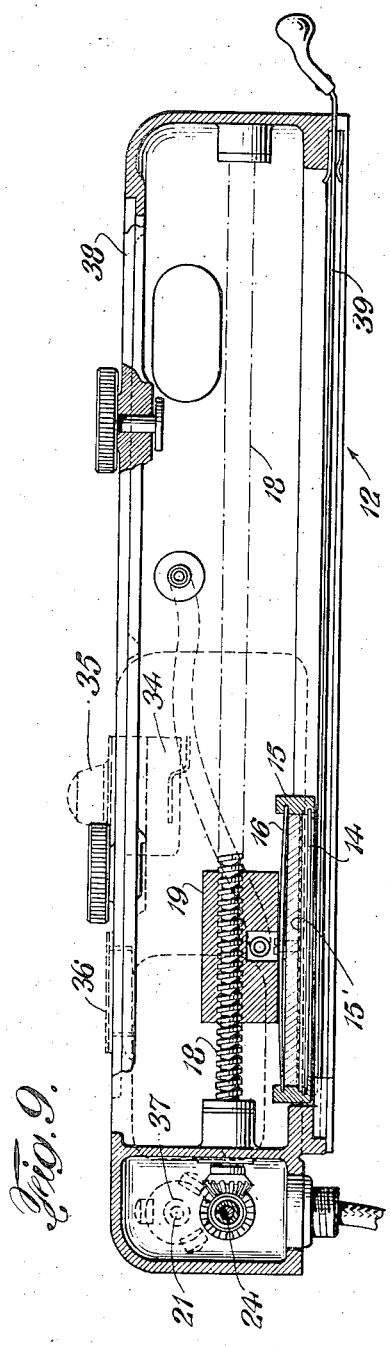
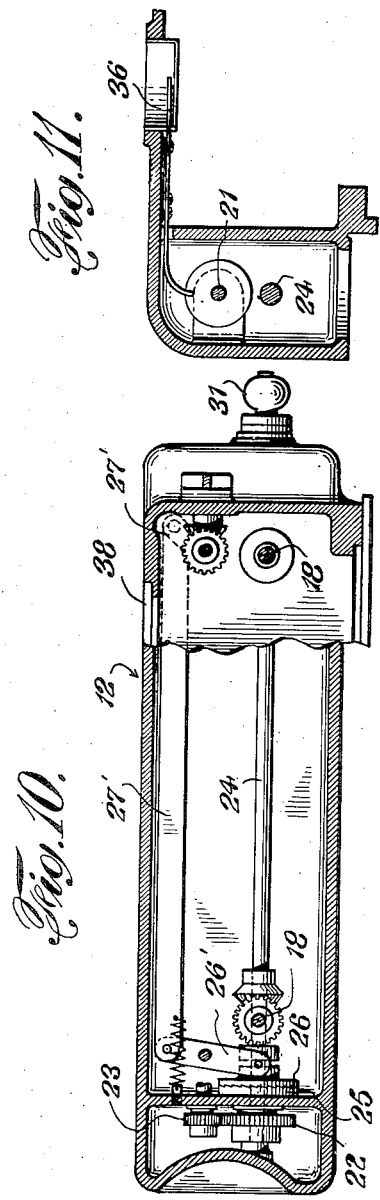
INVENTOR
Douglas F. Winnek
BY
Emery, Varney, Whittemore & Dix
ATTORNEYS Patented May 11, 1943

2,318,983

UNITED STATES PATENT OFFICE 2,318,983

STEREOPHOTOGRAPHY

Douglas F. Winnek, Rye, N. Y., assignor to Research Corporation, New York, N. Y., a corporation of New York Application September 13, 1940, Serial No. 356,626

2 Claims. (Cl. 95—18)

The art of stereo-photography has been advanced from the original practice of making a stereoscopic pair of separate photographs to be viewed in a stereoscope, to the present stage where a single stereo-composite photograph can be produced which is complete in itself, that is, may be viewed without the use of any instrumentality apart from the photographic medium itself. One of the intermediate steps which the art took before reaching this result was to make a stereo-composite by interposing a line-grating between the lens and photographic plate and then moving the lens, plate and grating during exposure so as "to scan" the object. In that way, a plurality of images of the object were recorded on the plate, each consisting of a large number of laterally displaced narrow strips or linear elements whose number and fineness depended on the ruling of the grating. But the photographs so produced had to be viewed through a similar grating accurately adjusted and attached a short distance in front of them, and the resulting combination of the grating with the photograph bore little resemblance to an ordinary photograph in physical appearance or in simplicity of make-up. Eventually, it was the conception of a lenticulated photographic film, coupled with a practical method of producing such film rapidly in commercial quantities and in optically perfect condition, that advanced the art to its present state. Such a method for producing lenticulated film is described in my patent application, Serial No. 199,738, which was filed on April 2, 1938 and allowed on March 26, 1940, and which issued on October 15, 1940 as Patent No. 2,218,227.

My present invention is of a method and apparatus for making photographic relief maps on my film for various purposes such, for example, as determining the elevation of objects photographed thereon with an aerial camera. And I have illustrated and described my invention herein as it might be used for that specific purpose. In the drawings, Figure 1 is a perspective view on a greatly enlarged scale of a piece of my lenticulated photographic film.

Figures 7 to 11 inclusive are enlarged detail views of the camera magazine, and

Figure 12:
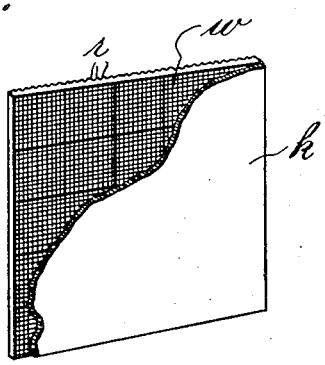

Figure 12 is a perspective view of a piece of my lenticulated film with the emulsion side foremost but broken away to show the scale markings on the film.

Figure 1:
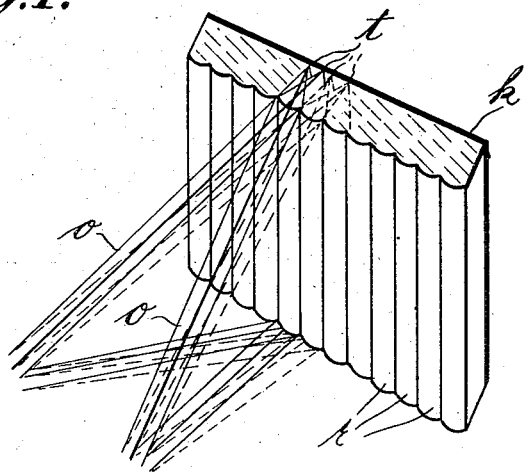
Figure 2:
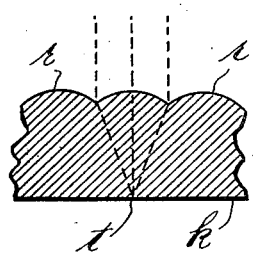
Figure 2 is a detail section thereof transverse to the lenticular ridges and on a still larger scale.

In order to explain my invention, it is first necessary to have a clear understanding of the nature and properties of my film. This film (Figures 1 and 2) is made from sheets or rolls of cellulose acetate, one side of which is coated with a photographic emulsion $k$ and the other provided with a plurality of very fine parallel ridges $r$ molded or embossed therein, to the number of 200 per inch or more, so as to be scarcely visible to the naked eye. These ridges are curvilinear in transverse section so as to form what are, in effect, a series of long narrow plano-convex lenses, each exactly alike and each having the same $f$ value which is such that impinging rays $o$ lying in a plane transverse to the ridges will be brought to a focus $t$ at the plane of the emulsion. In practice, I have found that an f-2 value (width of lens aperture equal to one-half focal distance for parallel rays) is preferable for many reasons; hence in manufacturing my film, I make the width of each lenticular ridge substantially one-half the thickness of the cellulose acetate film base.

When this film is exposed with its lenticular surface facing the camera lens and its emulsion surface slightly in advance of the focal plane of the camera lens, the rays which impinge on each ridge are contracted into a single linear element which corresponds to (that is to say, photographically records) a relatively long narrow strip of the terrain or other object being photographer. Thus the object, as actually photographed, is divided up into a plurality of component strips each of which is recorded upon the photographic emulsion by a single narrow line; and each of these narrow lines or elements is recorded on the portion of the emulsion directly opposite (behind) the ridge producing it, as will be obvious from Figure 1.

In a positive or negative thus made, that is, with a single recorded linear element opposite each ridge, the image would appear to a viewer only if the positive or negative were held at a particular angle, namely, the angle which will bring all the linear elements of the image into his line of vision; and when so viewed, the several component linear elements will be integrated into the complete image by the eye of the viewer. But since, in such a case, there would be but a single image to be viewed, there would be no stereoscopic or depth effect. To produce the latter, as well as to be able to view the image from different angles of vision, the exposure must be so made as to provide a plurality of these composite images instead of merely a single composite image. This may be done by moving the camera during exposure so as to photograph the object on the same film from different view points. And for a purpose which I shall explain later in describing my present invention, the film may also be moved relatively to the camera lens so that, in each of the composite images so recorded, all the linear elements formed by any particular lens-ridge of the film will always record the same strip or section of the object within fairly narrow limits of approximation. Since, while thus moving the camera and film to record this plurality of images, the lens may, and preferably does, remain continuously open, a continuous succession of images will be produced on the emulsion, in each of which the particular component (linear element) recorded by any one ridge will, as I have said, correspond to, that is, closely approximate, the same strip or element of the object being photographed. The continuous exposure made in this way I shall refer to as "scanning" the object and a camera so used a "scanning camera." The exposure will be complete when the emulsion area directly opposite, i. e. behind, each ridge is completely filled with the line recordings of the corresponding element or strip of the object photographed by the successive positions of the camera-lens and film during scanning.

Figure 3:
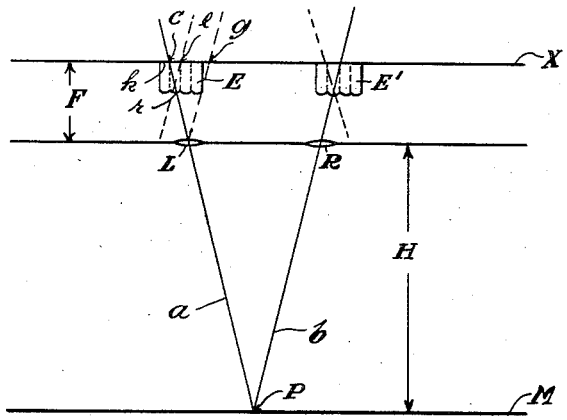
Figures 3, 4 and 5 are diagrams explanatory of the combined optical system of the film and camera lens and its relation to a so-called "datum plane" fixed by the exposure.

It can be readily seen from Figure 3 that to completely fill the emulsion area opposite each ridge with recordings in the foregoing manner, the amount of movement of both the camera and film during exposure is dependent upon the f value of the lenses formed by the lenticular ridges and the distance of the objective plane from the camera. Thus, suppose M to represent the objective plane in which, let us first assume, all the objects to be photographed lie; that P is a point in that plane, namely, the point where a line therein perpendicular to the plane of the paper intersects the plane of the paper; that L denotes the position of the camera lens at the beginning of the exposure, E a section of the lenticular film on a greatly enlarged scale with its ridged surface facing the lens and its emulsion surface $k$ slightly in advance of the focal plane X of the camera lens, and the points $c$ and $e$ the limits of the emulsion area directly opposite or behind a film-ridge $r$. Now, if we assume that an axial ray $a$ from the point P at the beginning of the exposure impinges upon the ridge $r$ in such a position as to meet the emulsion surface at $c$, it is obvious that the lens and film should be moved, to complete the exposure, to the positions denoted by R and E' respectively, so that an axial ray $b$ from the point P will meet the emulsion surface at $e$. In other words, the diagram of this figure shows to what extent the respective positions of both the film and camera lens should be shifted in relation to the point P, in order that the emulsion surface directly back of each lenticular ridge shall be completely covered by the linear recordings of the corresponding strip of the object during the exposure.

Now it is obvious from this diagram that the small isosceles triangle whose base is $ce$ is determined by the f value of the plano-convex lens formed by the ridge $r$ and that the large isosceles triangle PLR will be similar to that small triangle if the exposure is made in the manner above defined. Knowing, then, this f value (which may be defined as the ratio of the altitude to the base of the small isosceles triangle or expressed trigonometrically as a function of one-half its vertical angle), and knowing the distance H from the plane M to the camera lens, one can readily compute the distance or path LR through which the camera lens must be moved for a complete exposure of an object lying in the plane M. If, for example, this f value is 2 (whereby the base of the small isosceles triangle becomes one-half its altitude), the distance LR through which the camera lens is to be moved is then equal to ½ H. In a similar way, the relative movement of film to camera lens can be computed. That movement, denoted by the base $cg$ of the similar triangle L$cg$ whose altitude is approximately equal to the known distance F from the camera lens to its focal plane X, will therefore be ½ F in the case of the f-2 value assumed.

Figure 4:
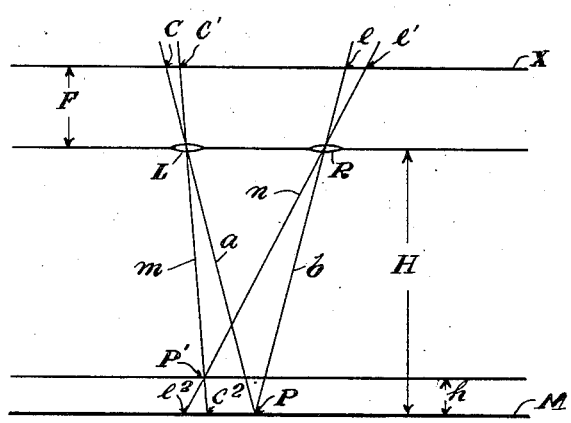

If all of the objects thus photographed should lie exactly in the plane M, as we have assumed up to this point, the developed film, despite the fact that it would present to the eyes of a viewer images taken from more than one view point, would still be lacking in stereoscopic or depth effect. That is to say, what the viewer would see is a flat plane; and of course that is exactly as it should be if, as assumed, all the objects photographed should lie rigorously in the plane M. But if there were objects in the field of vision located above or below this plane M, they would be recorded and indeed give a stereoscopic effect to the photograph; for during the exposure such objects would be seen by the camera, so to speak, in different positions against this plane M. This will be apparent from Figure 4.

Figure 5:
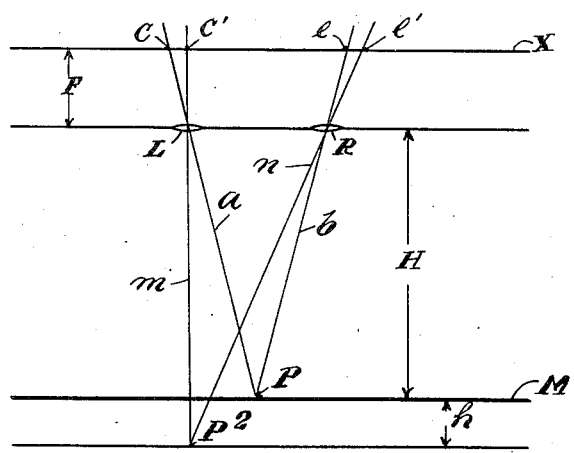

Referring now to that figure, let P' denote a point located above this plane M which I shall hereafter call the "datum plane." And for more concrete illustration, suppose the point P' to represent the top of a bridge-tower and the datum plane to be coincident with the level of a body of water which the bridge spans. Let X denote the focal plane, that is to say, the approximate plane of the emulsion surface; and let the limiting axial rays $a$ and $b$ from a point P in the datum plane meet the emulsion surface, as before, at the points $c$ and $e$ respectively, and the limiting axial rays $m$ and $n$ from the point P' meet the emulsion surface at $c'$ and $e'$ respectively. It will now be seen that as the point P' is viewed from the camera lens in one limiting position, it will appear against the background of the datum plane M at the point $c^2$ and from the other limiting position of the camera lens at the point $e^2$ on the datum plane; so that as the camera lens is shifted from one limiting position to the other the point P' will suffer a displacement against the background of the datum plane by a distance equal to $c^2e^2$. Similarly, Figure 5 shows how, by the shifting of the camera, a point $P^2$ below the datum plane also suffers a displacement against that plane.

My present invention is based upon the concept that by the exposure of my film I may fix the location of the datum plane in any predetermined position I desire in relaiton to the camera lens and object photographed, and that since all points in that plane will be recorded unshiftably in the image on the film I may, in consequence, determine the distance from the datum plane so fixed of any point in the object by measuring the amount by which the corresponding point in the image shifts its position when the image is scanned. For any measuring scale having a fixed position in the plane of the film as, for example, a scale printed on the film itself, will be related to all parts of the image in precisely the same way that a scale disposed in the datum plane (fixed by the exposure) is related to all parts of the object photographed. That is to say, if a scale were actually disposed in the datum plane, it would be reproduced as a fixed scale in the image on the film; but if located in any other position except in the datum plane, it would be reproduced on the film as a shiftable scale and thus be wholly impracticable for measuring purposes. Hence by fixing the position of the datum plane by the exposure so that it will occupy a predetermined relation to the camera lens makes it possible to calculate the exact location of any object photographed by measuring the displacement of its image on a scale placed in the plane of the emulsion.

I shall now refer to the camera (which, in the present case is an aerial camera) and describe the mechanism which I have embodied therein for moving the film during exposure and for coordinating this movement with both the elevation and movement of the camera, or, what amounts to the same thing, with the elevation and speed of the air-craft in which the camera is borne.

Figure 6:
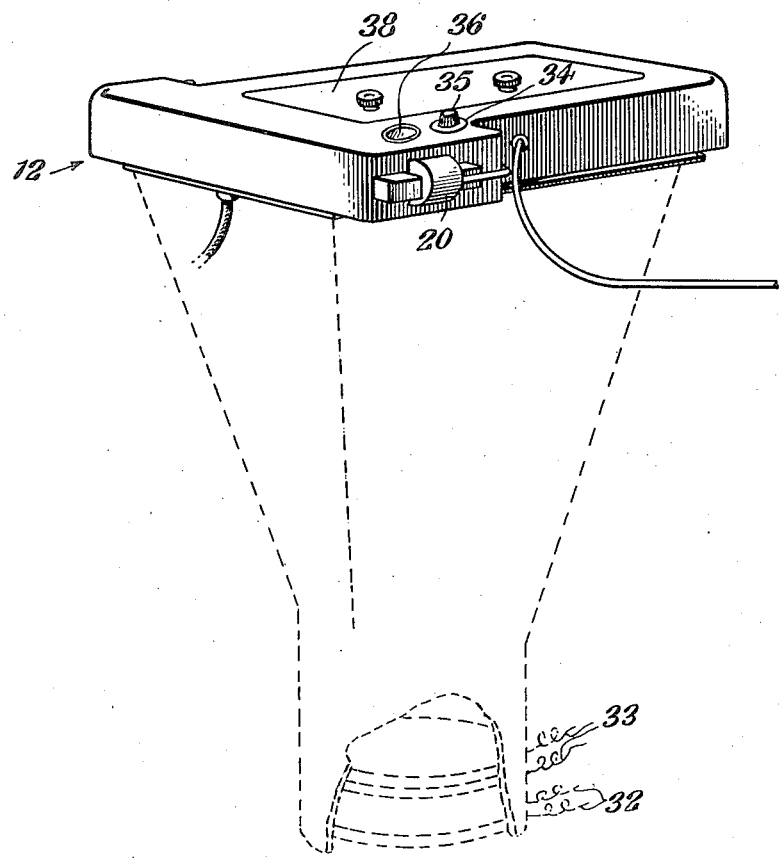
Figure 6 is a view in elevation of an aerial camera.
Figure 7:
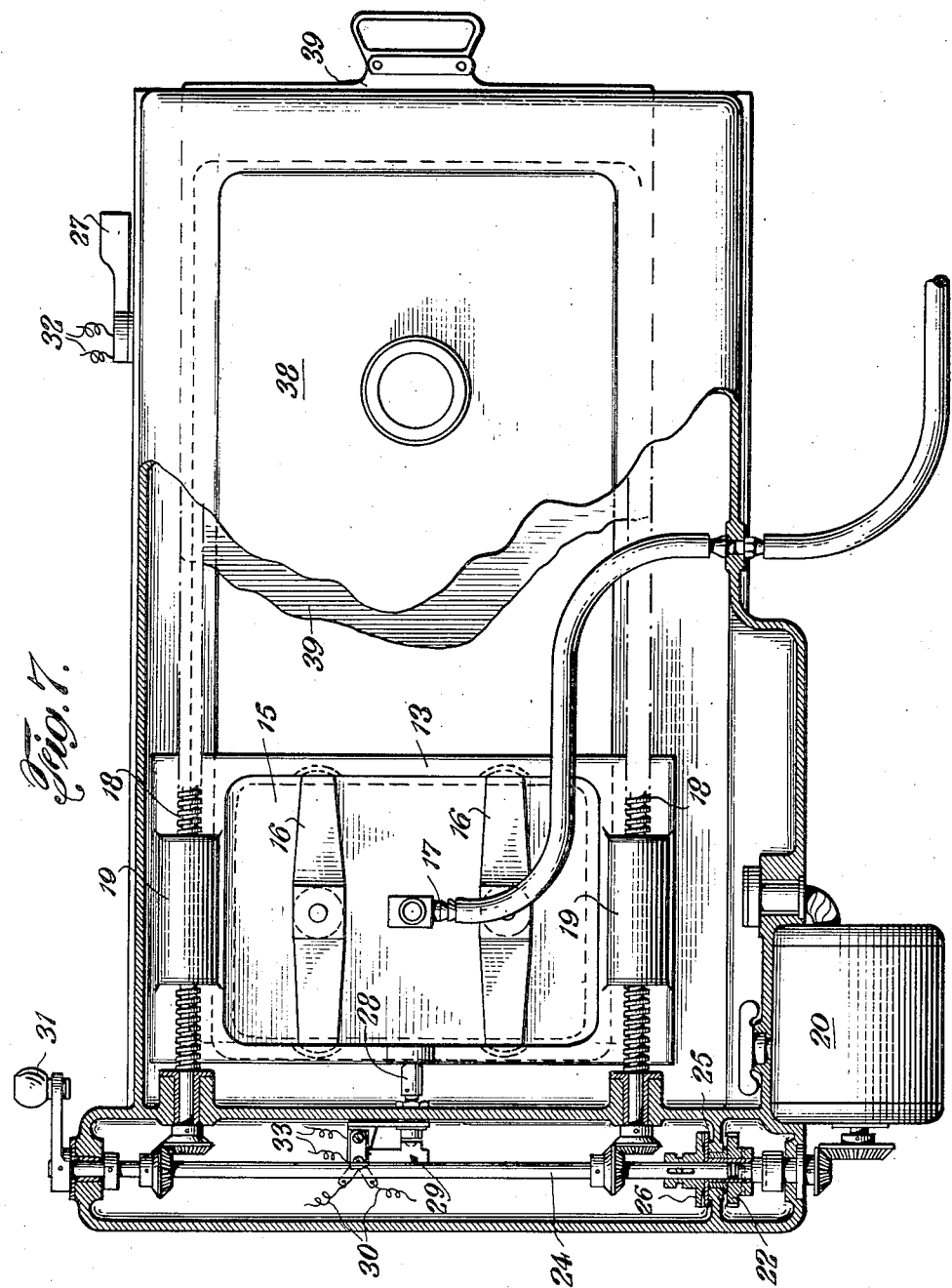
Figure 8:
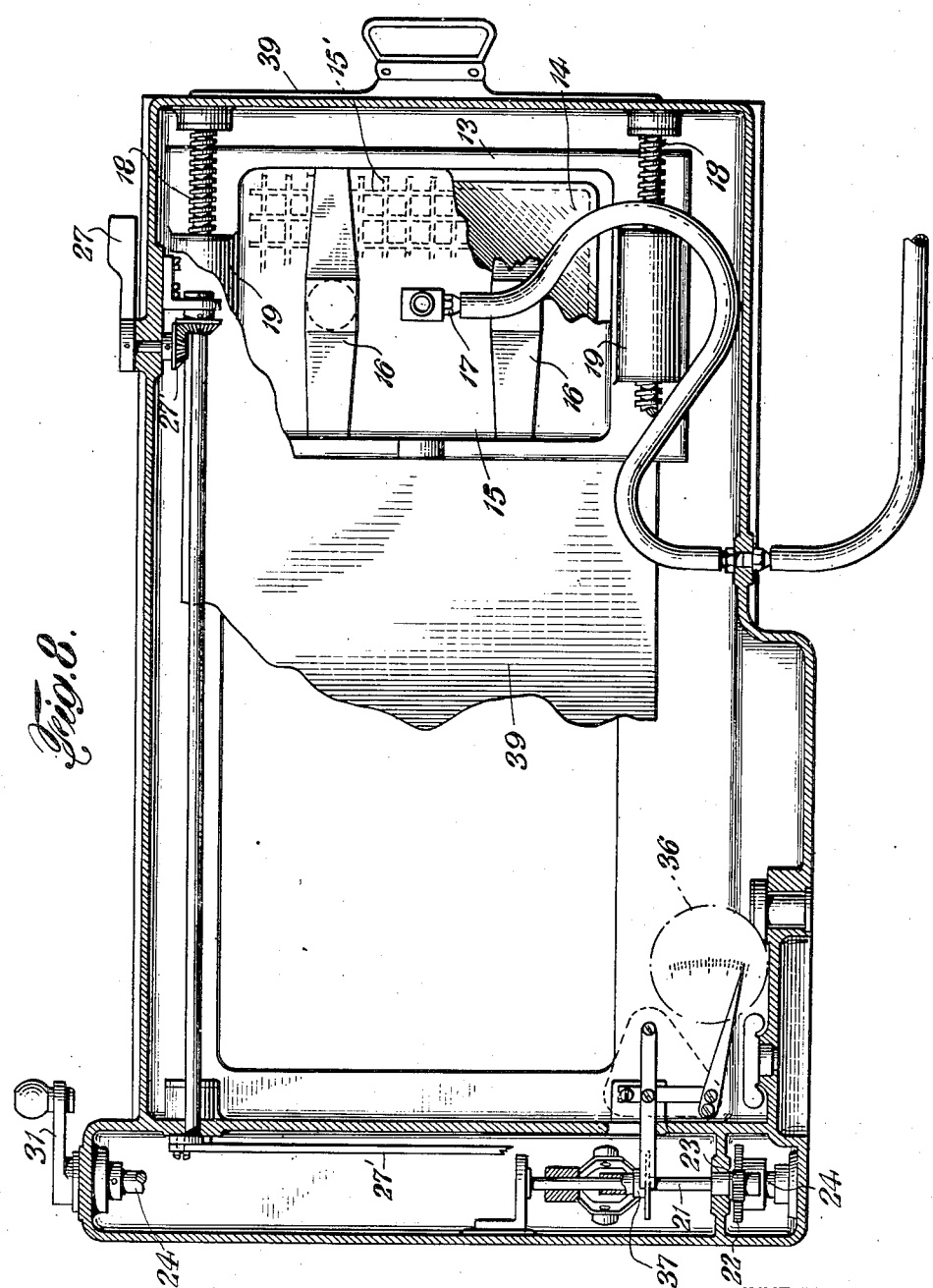

The main body of the camera whose outline and that of its lens is indicated in Figure 6, is provided with a detachable magazine 12 to house the photographic film. So far as the present invention is concerned, it is unnecessary to describe this main body or the means of mounting the camera in the air-craft to compensate for any off-level condition or any deviation of its longitudinal axis from the true line of flight. But it will be understood that such means are preferably provided, along with anti-vibrating devices and a deviation scale, in the customary manner or otherwise.

In the magazine, Figures 7 to 11 inclusive, I may use roll or cut film; but I shall describe here only the mechanism to be provided where the exposure is to be made on cut film. For this, I provide a film carrier which may have a suitable frame 13, a glass or other transparent front 14, and a back 15 held tightly in the frame by spring clamps 16. In loading the film carrier, a single piece of film is placed in the frame with its ridged face toward the glass so as to face the camera lens, and the back is then clamped down. In flight, a Venturi tube (not shown) may be used to pull a vacuum on the film and thus hold it perfectly flat against the back, for which purpose the face of the back may be provided throughout with grooves 15' all of which communicate with the Venturi tube through a nipple 17.

Since, during the exposure as already explained, the film is to be given a continuous uniform movement in the direction of flight (or in the opposite direction in case reversing mirrors are used in the camera), means are provided to impart such movement to the film carrier; and since, as has also been explained, the distance the film is to be moved or shifted during exposure is to be equal to one-half the focal distance of the camera lens if the f value of the lens-ridges is 2, the distance which the film is to be moved is readily determined. With the limits of movement of the film carrier thus ascertained, I provide two screw-shafts 18 extending along each side of the magazine and in threaded engagement with extensions 19 of the carrier frame and of such length that when continuously rotated to move the carrier either forward or backward, the latter will be brought to a stop in either one of its limiting positions. These screw-shafts are rotated by a motor 20 through the following mechanism: Connected to the motor so as to be rotated constantly thereby when the motor is in operation, is a counter-shaft 21 driven from the motor shaft through gears 22 and 23. Geared to the screw shafts 18 is a shaft 24 driven from the motor shaft through a one-way clutch, one member 25 of which is fast on the motor shaft and the other member 26 slidably keyed on the shaft 24 so that it may be thrown into engagement with its cooperating member 25 by a lever 27 extending through the casing of the magazine and operatively connected with the clutch member 26 by a linkage 27' terminating in a fork 26' which embraces the clutch member 26. The screw-shafts 18 are so disposed in respect of the pitch of their threads that when the motor is in operation and the clutch members are in engagement, the rotation of these shafts will advance the film carrier from its starting position at one end of the magazine to the limit of its movement at the other end of the magazine. At that point, the carrier contacts with and pushes forward, against the action of a spring (not shown), a slidable pin 28 which, in turn, opens a switch 29 in the motor circuit 30, thus stopping the motor. By means of a crank 31 in operative engagement with the screw-shafts 18, the latter may, after exposure, be rotated in a direction counter to that of their rotation by the motor, and the film carrier thus returned to its starting position where it is ready for another exposure as soon as the exposed film has been removed and a fresh one inserted.

The camera is preferably provided with an electrically operated lens-shutter (not shown); and electrical connections, indicated at 32, may be provided between the shutter and lever 27 whereby when the lever 27 is operated to throw the clutch and start the film carrier in motion, it will also open the lens-shutter for the exposure; and similarly, electrical connections, indicated at 33, may be provided between the lens-shutter and slidable pin 28 whereby the slidable pin 28, when it is moved by the film carrier to open the motor circuit upon the completion of the movement of the film carrier, will simultaneously close the lens-shutter.

In addition to the film shifting mechanism just described, I also provide in operative relation with said mechanism, a means for controlling the speed of the motor and for setting the mechanism to cause the screw-shafts to operate, in any given case, at a predetermined speed so that the complete shifting of the film carrier will be effected in precisely the time interval fixed for the exposure. As the scanning distance of the camera, that is to say, the path which the camera lens describes during the exposure, is to be equal to the distance of the camera from the datum plane divided by the f value of the lens ridges of the film, the length of that path should be substantially one-half the distance of the camera from the datum plane if the f value of the lens ridges is 2. Hence the exposure time, in such a case, is determined by dividing one-half the camera distance from the datum plane by the predetermined ground speed of the air-craft. In aerial photography this camera distance may ordinarily be taken as the elevation of the camera above sea level, unless the average level of the terrain photographed is a very substantial distance above sea level; and so throughout the present specification and claims my references to the average level of the terrain and to sea level are to be deemed interchangeable. Therefore, in calculating the exposure time in the average case where my invention is used in aerial photography, the distance of the camera from the datum plane will be read directly from the altitude meter of the air ship, whereupon the exposure time (for f–2 lens ridges) will be one-half the elevation thus read divided by the predetermined ground speed of the ship; and to save the time of making this calculation for each case, a chart may be prepared whereon the different exposure times are plotted or indicated for any combination of speed and altitude.

When the exposure time has thus been determined, the operator of the camera is able, through the speed control mechanism now about to be described, to set this mechanism so that the uniform movement of the film carrier from its initial to its final position will synchronize perfectly with the interval fixed for the exposure time. While any suitable mechanism may be provided for this purpose, the mechanism which I show here and prefer to use consists essentially of a rheostat 34 in the motor circuit operated from a knob 35 on the magazine casing, and a speed indicator 36 mounted on the magazine casing adjacent to the knob so that the speed of the motor 20 can be quickly read by the operator when making the adjustment. The needle of the indicator may be caused to respond to changes in the speed of the motor 20 by being operatively connected with the movable collar 37 of a ball governor, of familiar type, mounted on the countershaft 21 so as to rotate continuously therewith while the motor 20 is in operation. The scale of the indicator dial may be graduated and marked to indicate the respective times (number of flight seconds, for example) that it takes the film carrier to travel from its initial to its final position at different motor speeds; and in marking the graduations, consideration should be given to the fact that the motor will run slightly faster when it is running free than it will when the clutch is thrown to cause it to drive the film carrier. This differential in speed having been determined by first testing the mechanism, the dial graduations are then located and marked on the dial and appropriate numerals are added to indicate, in the case of each dial setting, the time required for the motor to effect a complete shifting of the film carrier.

The magazine 12 in which all this mechanism is housed should of course be light-tight. It may have a removable top cover 38 for convenience in loading and unloading; and it should be provided on its underside with a removable slide 39 so that after the loaded magazine has been bolted to the camera, the withdrawal of the slide will open up the magazine to the camera lens in readiness for an exposure.

Assuming that a piece of lenticulated film has been exposed in the manner described, and the image developed thereon, I shall now explain the manner of computing the comparative elevations of objects in the terrain so photographed or, to state this more specifically, how the distance of a point from the datum plane may be determined from the observed displacement of the corresponding point in the image. It will be understood, from the previous description of my film, that in viewing the developed image from the ridged side of the film (as, for example, by laying the film emulsion-side down on a piece of ground glass lighted from underneath), and by moving one's head from side to side so as to view the image from different angles in a plane transverse to the ridges, every point in the image which corresponds to a point in space above the datum plane will shift its position in a direction opposite to that of the movement of the head; and that every point in the image which corresponds to a point in space below the datum plane will shift in the same direction as the head is moved. If now, there are graduated scale marks on the ground glass or, preferably, if a graduated scale such as a grid $w$ (Figure 12) is printed or otherwise provided on the emulsion side of the film previous to coating it with the emulsion, then the limiting positions of any shiftable point of the image can be determined and measured against this scale. The amount of shifting so measured I call the apparent displacement of the point; and from Figure 4 it can be seen how this apparent displacement of any point in the image is related to the actual displacement of the corresponding point in space against the datum plane, as that point has been scanned by the camera during exposure. Having thus measured the apparent displacement of any point in the image, the distance of the corresponding point in space from the datum plane may be obtained at once by the use of a formula easily derived from Figure 4 as follows:

Let $d_1$ denote the distance $c$ $c'$ and $d_2$ the distance $e$ $e'$; then $(d_2-d_1)$ will be the observed displacement in the image of the point $P'$. Let this be measured and called $d$. Let $D_1$ denote the distance $Pc^2$ and $D_2$ the distance $Pe^2$; and let $H$ and $F$ respectively denote the distances from the camera lens to the datum plane and to the focal plane.

From triangles $Re^2P$ and $Ree'$ and triangles $Lc^2P$ and $Lcc'$ $$D_1=\frac{H}{F}d_1 \text{ and } D_2=\frac{H}{F}d_2$$

Therefore (1) $$D_2-D_1=\frac{H}{F}(d_2-d_1)=\frac{H}{F}d$$

From triangles $P'e^2c^2$ and $P'LR$ (2) $$D_2-D_1=\frac{Sh}{H-h}$$

where $S$ is the path $LR$ of the camera, i. e. the distance it moves during exposure, and $h$ the distance of the point $P'$ from the datum plane which is to be determined. But, as we have already shown (Fig. 3), $S$ will equal ½ $H$ if the $f$ value of the lens ridges of the film is 2. Therefore taking 2 to be the $f$ value and substituting ½ $H$ for $S$ in Equation 2, (3) $$D_2-D_1=\frac{Hh}{2(H-h)}$$

Equating now the values of $(D_2-D_1)$ in Equations 1 and 3 we have $$\frac{Hh}{2(H-h)}=\frac{H}{F}d$$

and solving this for $h$ we get $$h=\frac{H2d}{F+2d}$$

This last equation may be written $$h = 2d\frac{H}{F}\left(\frac{F}{F+2d}\right)$$

where $H/F$ is the reduction factor (distance of camera lens from datum plane divided by distance of camera lens from focal plane). This result shows that when the point P' is near the datum plane so that $d$ becomes relatively small, the factor $$\left(\frac{F}{F+2d}\right)$$

varies little from unity and in such a case may be taken as unity for all practical purposes. Thus, in using this formula in aerial work to determine the height of an object where the measured displacements of points in its image are relatively small, one simply multiplies any such measured displacement by twice the reduction factor. From Figure 5, the same calculation may be made for a point P² below the datum plane and the result will be $$h = 2d\frac{H}{F}\left(\frac{F}{F-2d}\right)$$

To determine the height of an object whose top or base does not lie in the datum plane, it is necessary first to compute the distances of both its top and its base from the datum plane. If, in viewing the image on the film in the manner described, both the top and base shift in the same direction that the head moves in viewing the image, then both the top and the base are below the datum plane, and if both shift in the opposite direction to the movement of the head, they are both above the datum plane, but if one shifts in one direction and the other in the opposite direction as the head is moved, they lie on opposite sides of the datum plane. Thus the height of the object will be the sum of the computed distances of its top and base from the datum plane in any case where both of their images shift in the same direction, whereas in the case of their shifting in opposite directions the difference between their computed distances from the datum plane will be the height of the object.

It remains to be pointed out that when my invention is not used in aerial photography but in X-ray photography, for example, or in a case where the object photographed will ordinarily be within fairly close range of the camera, it may be preferable to swing the camera in an arc in scanning the object, whereby both the path of the camera and the datum plane will be slightly curved or arcuate instead of straight or flat. In such a case, however, the angle which I have heretofore referred to as the vertical angle of the isosceles triangle determined by the f value of the lens ridges would remain the same; but the base of the imaginary isosceles triangle described by the camera lens would be an arc instead of a straight line and said arc would have the same number of degrees as said vertical angle which indeed it subtends. Theoretically, the base of that triangle, i. e. the camera lens path, is always arcuate, the straight line base being merely the limit of the arc when the object photographed is so far distant from the camera that, for optical purposes, its distance from the camera may be regarded as infinite. And in every application of my invention where the lens ridges of the film have an f-2 value, the vertical angle of the imaginary isosceles triangle aforesaid will be approximately 28° 14', whether its base be curved or straight, because that is the angle through which the camera must scan a point located in the datum plane, in order to record that point properly and completely on a film having f-2 lens ridges, in accordance with the method of exposure upon which my invention depends.

While I have described my invention in relation to its use in determining and measuring photographically the location of a point in space, whereby it is particularly useful, inter alia, in X-ray photography for surgical and diagnostic purposes as well as in aerial photography for determining the elevation of objects, I should point out that it has another and important use in mapping, quite distinct from its utility as a measuring instrumentality. Panoramic survey maps are generally made today by photographing, in sections or parts, a strip of terrain and then joining the sections or parts together to form a map of the strip. By the method or system of my invention, on the other hand, a continuous panoramic strip may be photographed as a unit, thus eliminating all the work of photographing separately, and then piecing together, individual parts of said strip. If any other method or system of continuous panoramic mapping, such as my invention provides, has been in use or available for use before, I am not aware of it.

I claim as my invention:

1. A method of locating and measuring the position of an object relative to a predetermined datum plane, comprising, focusing a camera on said datum plane, photographing said object on lens-ridged photographic film while moving the camera a distance substantially equal to its distance from the datum plane divided by the f value of the lens-ridges and while moving the film in the camera a distance substantially equal to the focal plane distance of its lens divided by the aforesaid f value, measuring the distance on the developed film through which the image of said object shifts its position as the film is scanned from one side to the other in viewing the image, and utilizing this measured distance to determine the distance between said object and said datum plane.

2. A method of locating and measuring the position of an object relative to a predetermined datum plane, comprising, photographing said object on lens-ridged photographic film while moving the camera a distance substantially equal to its distance from the datum plane divided by the f value of the lens-ridges and while moving the film in the camera in synchronization with the image of the datum plane, measuring the distance on the developed film through which the image of said object shifts its position as the film is scanned from one side to the other in viewing the image, and utilizing this measured distance to determine the distance between said object and said datum plane.

DOUGLAS F. WINNEK.